Patented Oct. 7, 1941

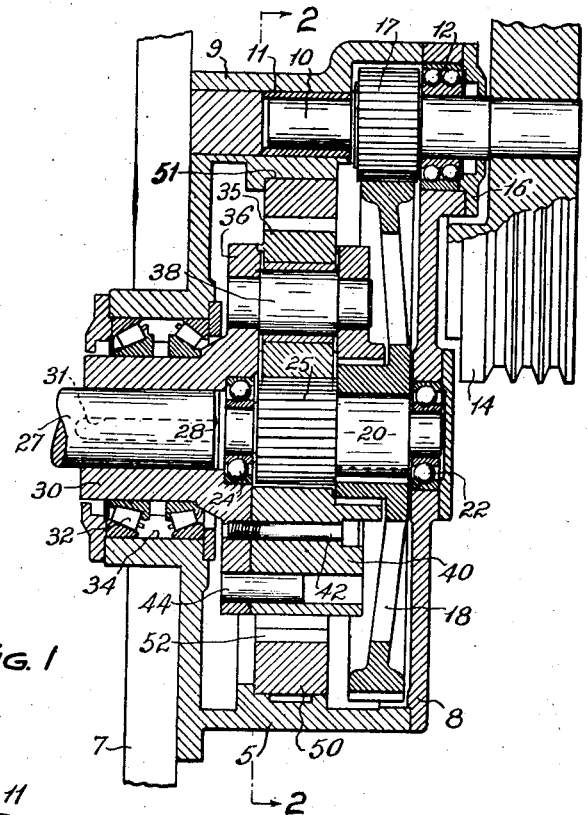

2,257,771

UNITED STATES PATENT OFFICE 2,257,771

BRAKE

Larkin R. Williamson, Brooklyn, N. Y., assignor to E. W. Bliss Company, Brooklyn, N. Y., a corporation of Delaware Application February 2, 1939, Serial No. 254,274

3 Claims. (Cl. 188—151)

This invention relates to mechanism for coupling a driving shaft and a driven shaft of a machine tool or the like to connect a source of power with a tool to be driven. The invention is particularly adapted for use in presses, shears and the like, which are operated through a single or relatively short cycle and are then stopped to remove the finished work and substitute new work.

In general, my invention is directed to a planetary gear system with which is incorporated a brake mechanism adapted to clamp one of the planetary gear train members against rotation, as desired.

Planetary gears as a drive means are very old and my invention is not directed to such a train per se but rather is directed to the combination of a train with the clamping brake system by which the same is rendered useful for the purposes outlined above.

More specifically in transmitting heavy loads, it is desirable to apply the clamping thrust on a gear train in such a manner that there is a minimum of strain with a consequent elimination of any torsion effect in the shafts and parts of the device. I have found that by providing a pair of operative shoes, either as a single pair or as several pairs, it is possible to obtain an improved clamping action which may be readily employed with a heavy duty machine without the resultant disadvantages heretofore encountered.

My improved device thus in general employs an outer floating internal gear which is clamped and retained against movement when the drive is effected between the driving and driven parts. Fluid pressure applied from a cylinder against a respective piston urges each of two aligned brake shoes into engagement with the floating gear to clamp the same as desired.

The general object of my invention has been to provide a simplified brake and associated mechanism and with this general object in view other objects will become apparent from the following specification and from the drawing.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various mechanical forms in which the principle of the invention may be used.

In said annexed drawing:

Fig. 1 is a transverse section through my improved mechanism; and

Fig. 2 is a section through Fig. 1 as indicated by the lines 2—2 thereon.

The drawing generally shows a main housing 5 suitably secured to the frame 7 of the machine with which my invention is employed. The housing is rigidly secured to the frame to eliminate, in so far as possible, any driving strain in the parts with a resultant effect on the life of the machine and its operation. The housing is open at the face remote from the machine portion 7 and is provided with a closely fitted removable cap 8 to seal this opening and support the part while readily permitting access thereto. The upper portion of the housing is provided with an enlarged boss 9 in which is journalled a stub shaft 10. One end of the shaft is supported in a sleeve bearing 11 in the housing and the other end is carried in a ball bearing 12 in the cap 8. The shaft extends beyond the cap and carries a pulley wheel 14 suitably keyed thereto for rotation. The pulley is driven by a series of V-belts passing thereover and engaging corresponding grooves in the outer surface and, in conjunction with the shaft 10, provides the driving part of the mechanism. Interposed between the pulley wheel and the bearing 12 is a cap 16 which may be readily removed from the main cap to permit access to the bearing for greasing.

The shaft 10 has keyed thereto a pinion 17 which is positioned between the bearings 11 and 12. This pinion is in mesh with and drives a large gear 18 which is keyed to a short stub shaft 20 mounted in ball bearings 22 and 24. The former set of bearings are carried in the cap 8 while the latter set are mounted in a portion of the driven mechanism as hereinafter described. The hub and toothed portion of the gear 18 are connected by an off-set web which provides space for partially mounting over the gear hub hereinafter to be described. Also keyed to the shaft 20 is a pinion 25 which lies closely against the inner portion of the opening 19 of the gear 18.

The driven shaft of the mechanism which connects with the operative portion of the machine tool is represented at 27 and terminates just within the housing at 28. Closely overlying the end of the shaft is a flanged sleeve 30 which is keyed thereto as at 31. The outer portion of the sleeve is concentric with the shaft and carries the inner races of a pair of tapered thrust bearings 32. The outer races are received within an enlarged opening 34 formed in an inwardly extending sleeve portion of the housing. The outer periphery of this sleeve portion in turn closely fits the machine frame 7 to provide a concentric assembly consisting of the shaft 27, the sleeve 31, the bearings 32, the housing sleeve and the corresponding opening in the frame 7. The sleeve 30 passes within the housing and flares outwardly to form a radial flange 36. A recess is provided concentric with the shaft 27 at the right hand face of the flange (Fig. 1) and this recess carries the outer race of the ball bearing unit 24 heretofore described, which permits the shafts 20 and 27 to rotate freely with respect to each other, although they are in alignment.

Three cluster gears 35 are carried by the flange 36 and rotate therewith. Each gear is rotatably mounted on a pin 38, which is reduced in cross section at each end and one end of which is carried in the aforesaid flange. The other end of each pin is carried in a reinforcing plate 37 in such manner that the three gears are spaced 120° apart and are each in mesh with the pinion 25. To maintain the reinforcing plate and the flange with respect to each other, the plate is provided with three roughly triangular extensions 40 which lie in face to face contact with the flange and are of sufficient depth to allow the cluster gears to run freely. The plate and flange are bolted together by nine bolts 42 passing through each of the triangular portions and additionally three dowels 44 are provided to secure the plate and flange together as an integral unit and to reinforce the bolts.

A large internal gear 50 is rotatably mounted on a housing in a raceway formed at 51 which is provided with a lip portion to prevent movement of the gear to the left (Fig. 1). This gear is provided on its inner annular face with teeth 52 which engage each of the pinions 35 and result in the gear 50 being normally slowly rotated by reason of the drive from the pinion 25 which rotates the pinions 35. The mounting of the parts is such that the gear 50 rotates more easily in its raceway than does the shaft 27 connected with the working parts of the machine. Accordingly, in normal operaion the gear 50, the cluster gears 35 and the pinion 25 are all in rotation while the shaft 27 remains still. When the gear 50 is clamped against rotation, however, the driving force of the pinion 25 rotates the cluster gears thereabout resulting in a drive to the machine parts through the shaft 27.

To drive the machine tool carrying the mechanism under discussion, a pair of opposed friction shoes 55 are urged into clamping relation with the outer annular face of the gear 50. These shoes are slidable in ways 56 in the housing and are each provided on its gear engaging face with suitable friction material 57. The ways 56 extend through the housing which is open at their outer ends to allow insertion of the shoes. Such openings are normally sealed by a removable cap 58 in each of which is formed a cylinder 59, which in turn carries a respective piston 60. Each cylinder in turn is sealed by a similar cap 62 which may be secured thereto. Clamped between the two caps is a diaphragm 64 which extends across the cylinder to provide a seal eliminating leakage inwardly between the piston and its associated cylinder wall. Fluid under pressure is admitted through an opening 65 to each cylinder and upon its admittance each piston forces a respective shoe into clamping relation with the internal gear 50 to lock the same against rotation.

As best shown in Fig. 2 the shoes and pistons lie in alignment with each other along a line passing radially through the axis of the shaft 27 and gear 50. If more than two pistons are employed, they should be spaced such that there is no sidewise thrust in the parts during engagement. Thus, if an even number of pistons are used, they should be mounted in aligned pairs and if an uneven number of pistons are employed, such as three, they should be equally spaced about the gear periphery.

To limit the outward movement of the parts when the mechanism stands idle, a bolt 68 is provided and mounted in a central boss 69 of the cap 62. At its inner end the bolt engages a clip 70 which may be adjusted inwardly or outwardly to control the amount of return in respective pistons 60 when the pressure is released and the drive is broken.

From the foregoing description it will be seen that I have devised a novel form of planetary drive mechanism and that with such mechanism I have devised a novel clamping means to control the parts in order to establish a drive as desired between the driving and driven shaft.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a driving mechanism, the combination of a housing, a rotatable member therein provided with a friction surface, said housing being formed with a generally radial bore and with the sides of said bore spaced apart to provide a pair of slideways for receiving a shoe mounted for movement toward and from said friction surface, a shoe slidably carried between said slideways and supported and aligned thereby at regions adjacent the ends thereof for sliding movement along said slideways, a cylinder carried by said housing, a piston in said cylinder mounted for movement toward and from said one friction surface and a face on said piston adapted to engage said shoe to urge the same into friction contact with said friction surface and means for actuating said piston.

2. In a driving mechanism, the combination of a housing, a rotatable member therein provided with a friction surface, said housing being formed with a plurality of bores extending in a direction generally radial of the axis of rotation of said member and with the sides of said bores spaced apart to provide respectively a pair of slideways for receiving shoes mounted for movement toward and from said one friction surface, a shoe slidably carried between the slideways in each bore and supported and aligned thereby at regions adjacent the ends thereof for sliding movement along said slideways, respectively towards said friction surface, a plurality of cylinders in alignment with said bores respectively, a piston in each cylinder mounted for movement toward and from said friction surface and a face on said piston adapted to engage said shoe to urge the same into friction contact with said friction surface and means for actuating said pistons.

3. In a driving mechanism, the combination of a housing, a drive member carried thereby with a friction surface formed on an annular portion thereof, a pair of diametrically spaced bores formed in said housing with the sides of each of said bores spaced from the other respectively to provide a pair of opposed slideways for receiving shoes mounted for movement toward and from said friction surface, a shoe slidably carried in each bore and supported and aligned adjacent its ends by said slideways for sliding movement therealong, a pair of cylinders formed in said housing, one extending coincident with the axis of travel of said shoes respectively, and a face on each of said pistons adapted to engage said shoes respectively to urge the same into friction contact with said friction surface.

LARKIN R. WILLIAMSON.